April 14, 1959　　　E. L. SWAINSON　　　2,882,484

NULL SHIFTING DEVICE FOR VARIABLE DYNAMO TRANSFORMERS

Filed Oct. 19, 1956

INVENTOR.
EDWARD L. SWAINSON

BY
ATTORNEYS

United States Patent Office 2,882,484
Patented Apr. 14, 1959

2,882,484

NULL SHIFTING DEVICE FOR VARIABLE DYNAMO TRANSFORMERS

Edward L. Swainson, Newtonville, Mass., assignor, by mesne assignments, to American Radiator & Standard Sanitary Corporation, New York, N.Y., a corporation of Delaware Application October 19, 1956, Serial No. 616,967

4 Claims. (Cl. 323—51)

This invention relates to variable dynamo transformers of the type generally disclosed in United States Letters Patent to Mueller, No. 2,488,734; in one respect the invention comprises an improvement upon the devices disclosed in the aforesaid patent.

Since the details and theory of operation of the variable dynamo transformer are fully disclosed in the Mueller patent, it will be necessary here only to say that the device comprises a rotor surrounded by a stator having at least two pairs of magnetic poles provided with coils, preferably series connected primary and secondary windings. The rotor has circular end portions each of which spans the distance between the centers of two adjacent poles of the stator, the normal or neutral position of the rotor is with the edges of the circular portions at the centers of the pole faces. Because of variations in the manufacture of the components, it has been found that in production the zero position of the rotor does not always coincide with the zero or null output of the secondary coils. This lack of coincidence of the mechanical and electrical null positions introduces obvious errors and difficulties of calibration.

The object of the invention is to bring into coincidence the electrical and mechanical null positions of a variable dynamo transformer.

An important feature of the invention resides in the provision of a simple electrical circuit provided with adjustable means for shifting the electrical null position of a variable dynamo transformer in order that the null reading of the instrument may coincide with the neutral position of the rotor.

Figure 1:
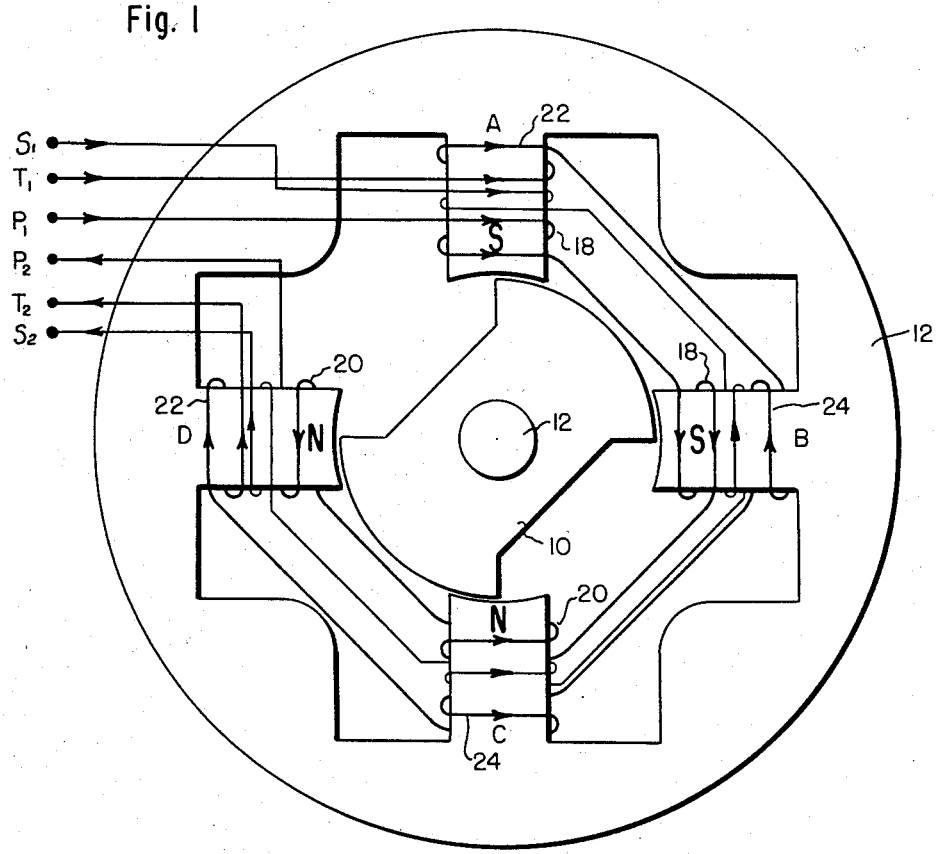
Figure 2:
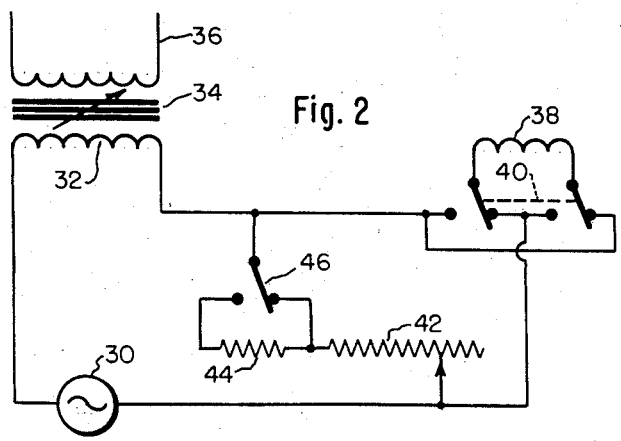

These and other objects and features of the invention will be more readily understood and appreciated from the following detailed description of a preferred embodiment thereof selected for purposes of illustration and shown in the accompanying drawings in which:

Fig. 1 is a diagrammatic view of a variable dynamo transformer equipped with the null adjusting circuit of the invention, and Fig. 2 is a diagram of the circuit employed.

As shown in Fig. 1 the variable dynamo transformer includes a rotor 10 mounted on a shaft 12 and having identical end portions or segments the peripheries of which are arcuate. The rotor is disposed within a stator including an outer annulus 12 and four inwardly directed pole pieces A, B, C and D. Here it may be stated that the number of pole pieces is not critical or limited. As a matter of fact, a variable dynamo transformer with twenty-four poles has been found quite satisfactory in practice, but for purposes of illustration, the four pole device shown in Fig. 1 has been selected as the simplest form. It will be seen that the edges of one arcuate end portion of the rotor are aligned with the centers of the two adjacent poles A and B whereas the edges of the opposite end of the rotor are in alignment with the centers of the pole pieces C and D. The rotor may also be positioned 90 degrees from the position shown, if desired.

Primary coils are wound upon all four of the pole pieces, the pole windings being arranged so that, at the instant the alternating current is flowing in the direction of the arrows, poles A and B will be south poles, and poles C and D will be north poles. At the next reversal of the alternating current each pole will reverse its polarity. All four primary windings are connected in series. The device is completed by series connected secondary windings, one on each pole piece, the directions of the secondary windings being opposite to that of the primary windings on poles B and D and in the same direction as the primary windings on poles A and C.

Each pole piece is also provided with a tertiary winding having relatively few turns as compared to the turns in the primary windings. The tertiary winding 22 is in the same direction on poles A and D, and is opposite to the direction of windings 24 on the poles B and C. If, now, a current is passed through both primary and tertiary windings, which at some instant has a direction as indicated by the arrows, it will be seen that the magnetomotive forces are cumulative on poles A and C and subtractive on poles B and D. It thus becomes possible to alter the flux pattern by controlling the current in the tertiary, thus changing the voltages induced in the secondary coils. If the instantaneous direction of the current flow in the tertiary windings 22 and 24 is the reverse of that shown by the arrows, the magnetomotive forces will be subtractive on poles A and C and cumulative on poles B and D. Since the null position of the rotor with respect to the stator occurs when there is equal flux in each of the poles, it can be seen that any non-symmetry of the flux caused by non-symmetrical location of the rotor can be equalized by establishing a current in the tertiary winding of the proper direction and magnitude, within limits determined by the primary to tertiary turns ratio and current ratio. By this means, the electrical null may be brought into coincidence with the mechanical zero position.

In Fig. 2 there is shown a circuit diagram illustrating one convenient method for employing the tertiary windings to shift the electrical null of the instruments. From a suitable source of alternating current 30, the current flows through the primary windings 32 and then through the tertiary windings 38. A switch 40 is connected to the terminals of the tertiary windings 38 in order to provide for reversing the direction of current flow through the tertiary windings. Shunted across the tertiary windings is a rheostat 42 in order that the circuit may be trimmed to allow only the proper amount of current to pass through the tertiary windings and thereby shift the null of the instrument in the direction governed by the switch 40. The adjustment of the rheostat serves to vary the current through the tertiary windings, a function which may be accomplished by other means, as will be apparent to those skilled in the art. The rotor and secondary windings are suggested at 34 and 36 respectively.

It has been found convenient to employ up to at least 5% as many turns in the tertiary winding as in the primary winding, making it possible to shift the null position up to at least 5% of the full scale. It has also been found convenient to employ a rheostat having approximately ten times the impedance of the tertiary winding, thus making it possible to vary the current in the tertiary winding over a range which is adequate for most purposes.

It will be appreciated that the tertiary windings may equally well be energized from a source independent of the supply for the primary windings, in which case the ratio of tertiary to primary turns could obviously be quite different.

In employing the device of the invention it is only necessary to set the rotor 10 at its neutral position and determine whether the neutral position of the rotor coincides with the electrical null of the system. If it is found that the two do not coincide, the electrical null may be shifted to coincide with the null position of the rotor by appropriate manipulation of the rheostat 42, the switch 40 being used to determine the proper direction for the adjustment. Obviously any change in the coincidence of the mechanical and electrical nulls of the device during use may be compensated for by a further adjustment of the rheostat.

In certain instances it has been found that the mechanical zero position of a variable dynamo transformer will vary with changes in temperature. In that event automatic compensation may be introduced in the circuit of the invention by inserting a suitable network which will change impedance with temperature, such as a negative temperature coefficient resistor or a thermistor 44. This may easily be accomplished by providing a switch 46 to switch the network 44 in or out of the circuit. Of course the rheostat 42 would then have to be adjusted to rebalance the instrument. Alternatively, this network may replace rheostat 42 if it can be arranged to have the proper characteristics.

Having thus disclosed my invention what I claim as new and desire to secure by Letters Patent of the United States is:

1. In a variable dynamo transformer including a stator having at least two pairs of magnetic poles, a rotor mounted within the stator, and primary and secondary coils wound on said poles; a null shifting device comprising series connected tertiary windings wound on said poles in inductive relation to said primary coils, a source of alternating current connected to said windings, and means for establishing the correct value of current through said tertiary windings.

2. Apparatus for shifting the electrical null position of a variable dynamo transformer having a plurality of poles and primary windings on said poles; comprising additional windings on said poles, the number of turns in said additional windings on each pole being less than the number of turns in the primary windings, the direction of said additional windings with respect to the primary windings being alternately opposed and the same uppon successive poles, and means for passing alternating current through said additional windings.

3. Apparatus for shifting the electrical null position of a variable dynamo transformer having a plurality of poles and primary windings on said poles; comprising additional windings on said poles, the direction of said additional windings with respect to the primary windings being alternately opposed and the same upon successive poles, means for passing alternating current through said additional windings, and a network with a temperature variant impedance connected in the circuit supplying said alternating current.

4. In a variable dynamo transformer including a stator having at least two pairs of magnetic poles, a rotor mounted within the stator and primary and secondary coils wound on the poles; a null shifting device comprising series connected tertiary coils wound on said poles in inductive relation to said primary coils, means for passing a current through said tertiary coils, and means for adjusting the magnitude of said current.

References Cited in the file of this patent
UNITED STATES PATENTS
2,488,734    Mueller _____ Nov. 22, 1949